United States Patent
An

(10) Patent No.: US 7,536,111 B1
(45) Date of Patent: May 19, 2009

(54) OPTICAL COMMUNICATION WITH PHASE ENCODING AND OPTICAL FILTERING

(75) Inventor: Fu-Tai An, Stanford, CA (US)

(73) Assignees: Sprint Communications Company LP, Overland Park, KS (US); The Board of Trustees of the Leland Stanford Junior University, Palo Alto, CA (US)

( * ) Notice: Subject to any disclaimer, the term of this patent is extended or adjusted under 35 U.S.C. 154(b) by 1243 days.

(21) Appl. No.: 10/150,852

(22) Filed: May 17, 2002

(51) Int. Cl.
*H04B 10/04* (2006.01)
(52) U.S. Cl. .................................... 398/183
(58) Field of Classification Search ............... 398/183, 398/186, 188, 198, 192, 201; 385/37; 359/341.41, 359/341.4
See application file for complete search history.

(56) References Cited

U.S. PATENT DOCUMENTS

| | | | |
|---|---|---|---|
| 3,108,261 A | | 10/1963 | Miller |
| 3,646,534 A | | 2/1972 | Miller |
| 4,623,886 A | * | 11/1986 | Livingston ............... 340/825.5 |
| 5,099,348 A | * | 3/1992 | Huddleston et al. ......... 698/107 |
| 5,227,908 A | * | 7/1993 | Henmi ...................... 398/192 |
| 5,706,375 A | * | 1/1998 | Mihailov et al. ............. 385/24 |
| 5,754,718 A | * | 5/1998 | Duck et al. .................... 385/37 |
| 5,760,960 A | * | 6/1998 | Lin et al. .................... 359/569 |
| 5,812,712 A | * | 9/1998 | Pan ............................ 385/37 |
| 6,490,080 B2 | * | 12/2002 | Cornelius et al. ...... 359/341.41 |
| 6,819,879 B1 | * | 11/2004 | Wan .......................... 398/199 |
| 2001/0021047 A1 | * | 9/2001 | Sasai et al. .................. 359/124 |

OTHER PUBLICATIONS

W. Idler, S. Bigo, Y. Frignac, B. Franz, G. Veith, "Vistigial Side Band Demultiplexing for Ultra High Capacity (0.64 bit/s/Hz) Transmission of 128×40 Gb/s Channels," MM3-1 1999 Optical Society of America.

Kazushige Yonenaga and Noboru Takachio, "A Fibert Chromatic Dispersion Compensation Technique with an Optical SSB Transmission in Optical Homodyne Detection Systems," 1993 IEEE pp. 949-951.

Graham M. Smith, Dalma Novak, and Zaheer Ahmed, "Overcoming Chromatic-Dispersion Effects in Fiber-Wireless Systems Incorporating External Modulators," 1997 IEEE, vol. 45, No. 8, pp. 1410-1413.

* cited by examiner

*Primary Examiner*—Quan-Zhen Wang

(57) ABSTRACT

A communication system receives user data and a first optical signal. The communication system then phase encodes the user data to form an encoded signal representing the user data. The communication system then modulates the first optical signal with the encoded signal to form a second optical signal representing the user data. The communication system filters the second optical signal in the optical domain to form an optical single sideband signal representing the user data. The communication system transmits the optical single sideband signal representing the user data.

18 Claims, 8 Drawing Sheets

OPTICAL COMMUNICATION WITH PHASE ENCODING AND OPTICAL FILTERING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to communication systems and methods with phase encoding and optical filtering.

2. Description of the Prior Art

Communication systems use optical signals to communicate over optic fiber. Some of these systems transmit optical signals with a carrier frequency and sidebands. These sidebands carry the user data and are at frequencies slightly above and below the carrier frequency. In Optical Vestigial Sideband (OVSB) transmission, a portion of the redundant sideband is removed to form a vestigial sideband signal because a vestige of the sideband remains. Some prior systems have used optical filters in OVSB transmission. One example of an optical filter is a Fiber Bragg Grating (FBG) filter. Ultraviolet light is shined on an FBG filter to generate gratings that in turn interacts with an optical signal for filtering the optical signal. One problem with optical filters in general is the filtering is non-ideal, where the target frequencies are not completely filtered, and the neighboring non-target frequencies are partially filtered. OVSB does reduce the channel bandwidth, but one problem with OVSB is the residual sideband still occupies a significant portion of the transmission spectrum and limits the spectral efficiency.

In Optical Single Sideband (OSSB) transmission, one of the sidebands is almost completely removed. Some prior systems using OSSB transmission have used electrical sub-carrier techniques. However, these systems require complicated analog circuitry. Also, the data rate is limited. One goal for designing systems that use OSSB transmission is to have a main signal power spectrum with no or negligible DC and low frequency components.

Prior electrical systems have used various encoding techniques for better binary signal performance. The simplest technique is non-return to zero (NRZ), where a binary 1 is represented by optical power within a bit period and a binary 0 is represented by zero optical power. Another technique is return to zero (RZ), where a binary 1 is an optical pulse while binary 0 means no optical power. Other types of encoding use phase transition of the signal to indicate a 1 or a 0, which is called phase encoding. One example of phase encoding is Manchester encoding. In Manchester encoding, a logical 0 is by a transition at the edge of a bit period, while a logical 0 is represented by a transition at the bit center. One problem with Manchester coding optical signals is the signal spectrum is doubled as compared with NRZ line coding.

Another example of phase encoding is Miller encoding, which is also called delay modulation. In Miller encoding, a logical 1 is represented with a phase transition at the bit center. A logical 0 is represented with no phase transition at the bit center. Two consecutive logical 0 has a phase transition at the boundary of the end of the first bit. Miller coding concentrates signal's power spectral density such that the signal's spectral occupancy is narrow. Miller coding has not been used in externally-modulated optical communication systems.

SUMMARY OF THE INVENTION

The inventions solve the above problems by phase encoding and optical filtering. A communication system receives user data and a first optical signal. The communication system then phase encodes the user data to form an encoded signal representing the user data. The communication system then modulates the first optical signal with the encoded signal to form a second optical signal representing the user data. The communication system filters the second optical signal in the optical domain to form an optical single sideband signal representing the user data. The communication system transmits the optical single sideband signal representing the user data.

In some embodiments, phase encoding the user data comprises Miller encoding the user data. In other embodiments, phase encoding the user data comprises Manchester encoding the user data. In some embodiments, the communication system generates the first optical signal. In some embodiments, filtering the second optical signal in the optical domain uses a Fiber Bragg grating filter for the second optical signal.

Thus, with optical filtering in some embodiments, no RF circuitry is needed for sideband suppression. Also, in some embodiments, the phase encoding advantageously prevents link impairments such as chromatic dispersion.

BRIEF DESCRIPTION OF THE DRAWINGS

The same reference number represents the same element on all drawings.

DETAILED DESCRIPTION OF THE INVENTION

FIGS. 1-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
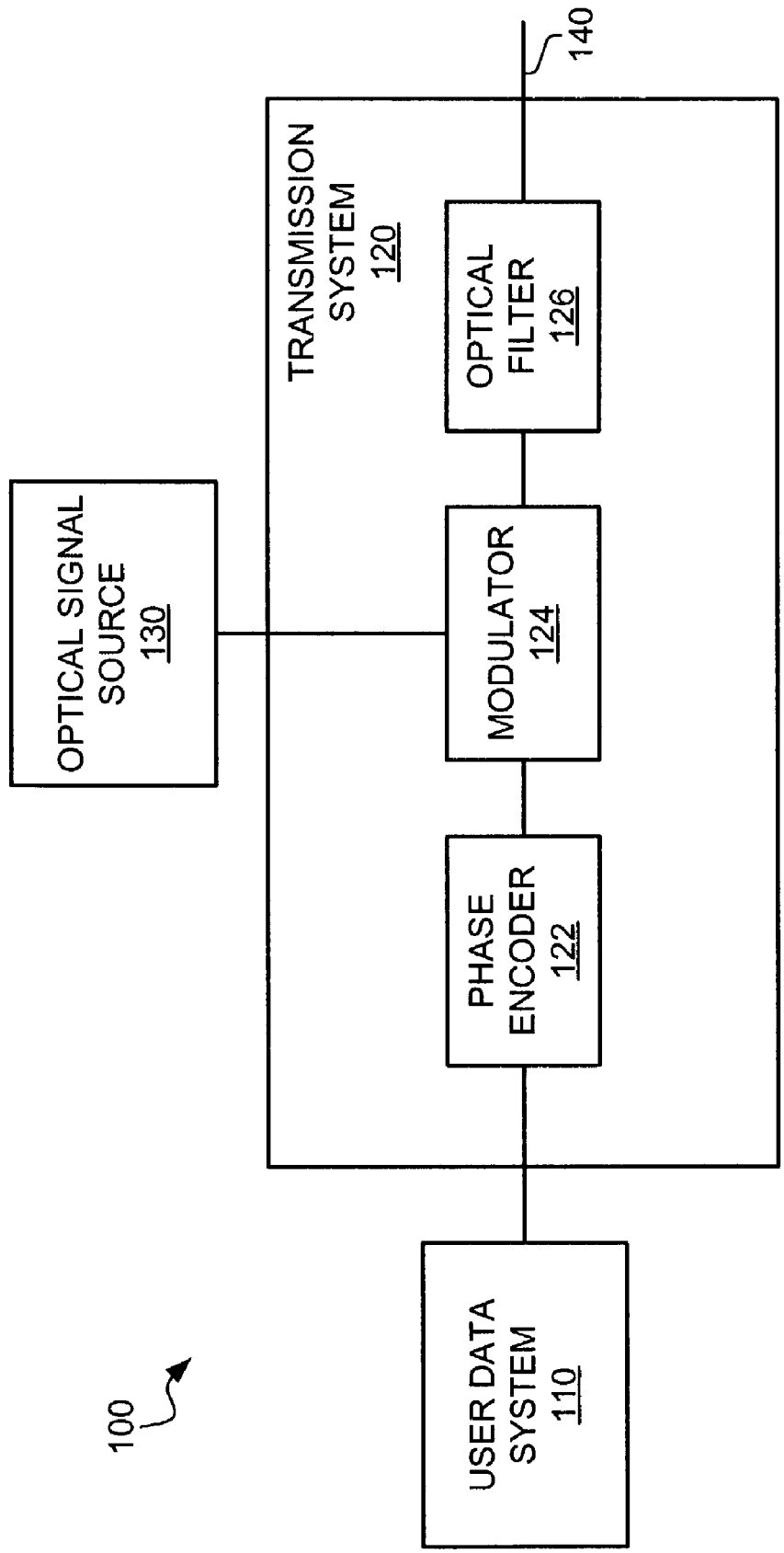
FIG. 1 is a block diagram of a communication system in an example of the invention.
Figure 2:
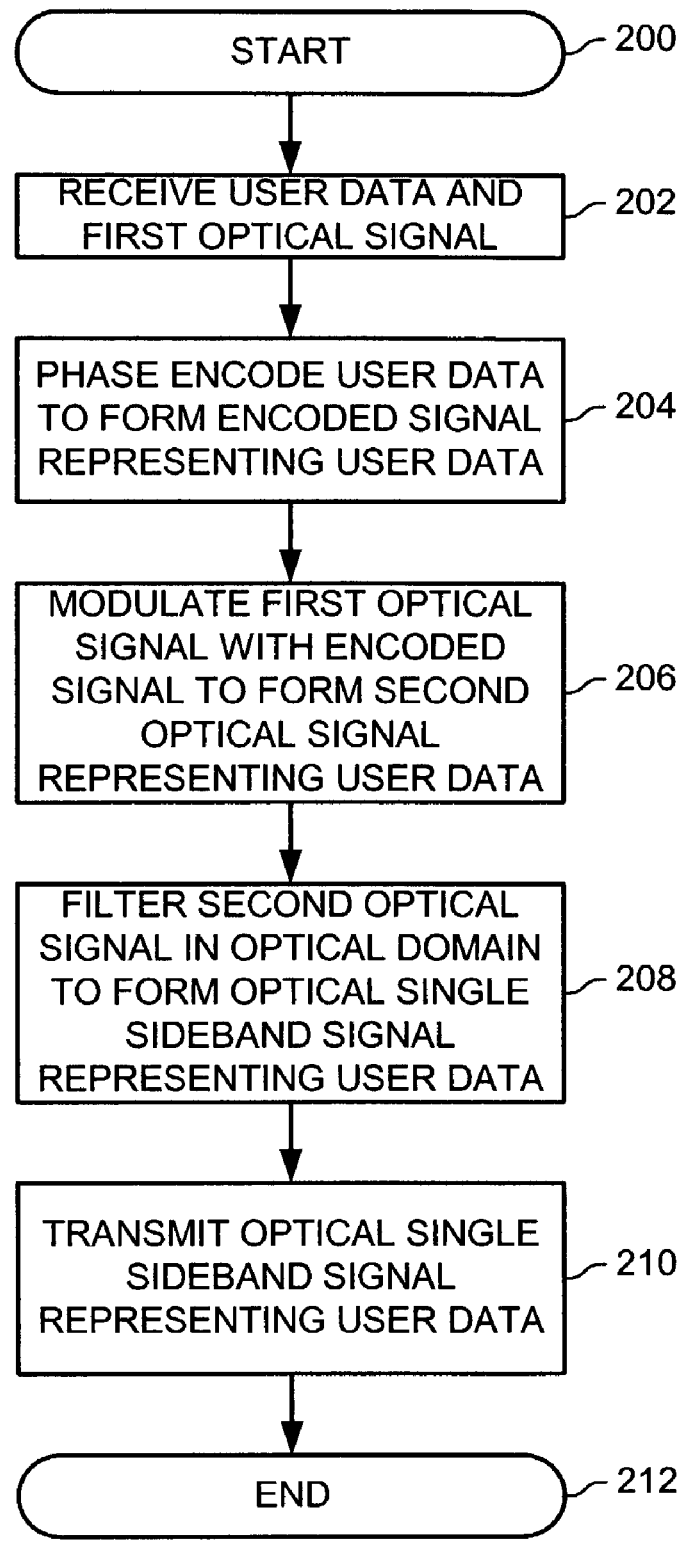
FIG. 2 is a flow chart of a transmission system in an example of the invention.

Communication System—FIGS. 1-2

FIG. 1 depicts a block diagram of a communication system 100 in an example of the invention. The communication system 100 includes a user data system 110, a transmission system 120, and an optical signal source 130. The transmission system 120 includes a phase encoder 122, a modulator 124, and a filter 126. The user data system 110 is connected to the phase encoder 122. The phase encoder 122 is connected to the modulator 124. The modulator 124 is connected to the optical signal source 130 and the optical filter 126. The optical filter 126 is connected to an optic fiber 140. In some embodiments, the user data system 110 and the optical signal source 130 are within the transmission system 120.

The user data system 110 is any device, group of devices, or system configured to transmit user data. User data is any data or information that users communicate with over a communication network. The transmission system 120 is any device, group of devices, or system configured to (1) receive user data and a first optical signal, (2) phase encode the user data to form an encoded signal representing the user data, (3) modulate the first optical signal with the encoded signal to form a second optical signal representing the user data, (4) filter the second optical signal in the optical domain to form an optical single sideband signal representing the user data, and (5) transmit the optical single sideband signal representing the user data. Phase encoding is a method of changing the form of data or information into signals such that the phases of the signals indicates a binary representation of the data or information. Some examples of phase encoding are Manchester and Miller coding. An encoded signal is any signal that is phase encoded. An optical single sideband signal is any optical signal where the signal comprises a carrier and one sideband that carries data or information.

The phase encoder 122 is any device or system configured to receive user data and phase encode the user data to form an encoded signal representing the user data. One example of the phase encoder is the Miller encoder in FIG. 3 described below. The modulator 124 is any device or system configured to receive the first optical signal and modulate the first optical signal with the encoded signal to form a second optical signal representing the user data. One example of the modulator 124 is the Mach-Zehnder modulator in FIG. 3 described below. Another example of the modulator 124 is an Electro-absorption modulator. The optical filter 126 is any device or system configured to filter the second optical signal in the optical domain to form an optical single sideband signal representing the user data and transmit the optical single sideband signal representing the user data. One example of the optical filter 126 is the Fiber Bragg Grating filter in FIG. 3 described below. The optical signal source 130 is any device or system configured to transmit optical signals. One example of the optical signal source 130 is a tunable laser source. In another example, the optical signal source 130 is any laser source.

FIG. 2 depicts a flow chart of the transmission system 120 in an example of the invention. FIG. 2 begins in step 200. In step 202, the phase encoder 122 receives the user data from the user data system 110, and the modulator 124 receives the first optical signal from the optical signal source 130. In step 204, the phase encoder 122 phase encodes the user data to form an encoded signal representing the user data. In step 206, the modulator 124 modulates the first optical signal with the encoded signal to form a second optical signal representing the user data. In step 208, the optical filter 126 filters the second optical signal in the optical domain to form an optical single sideband signal representing the user data. The optical filter 126 then transmits the optical single sideband signal representing the user data via the optic fiber 140 in step 210. FIG. 2 ends in step 212.

Communication System with Fiber Bragg Grating Filter—FIGS. 3-8

Figure 3:
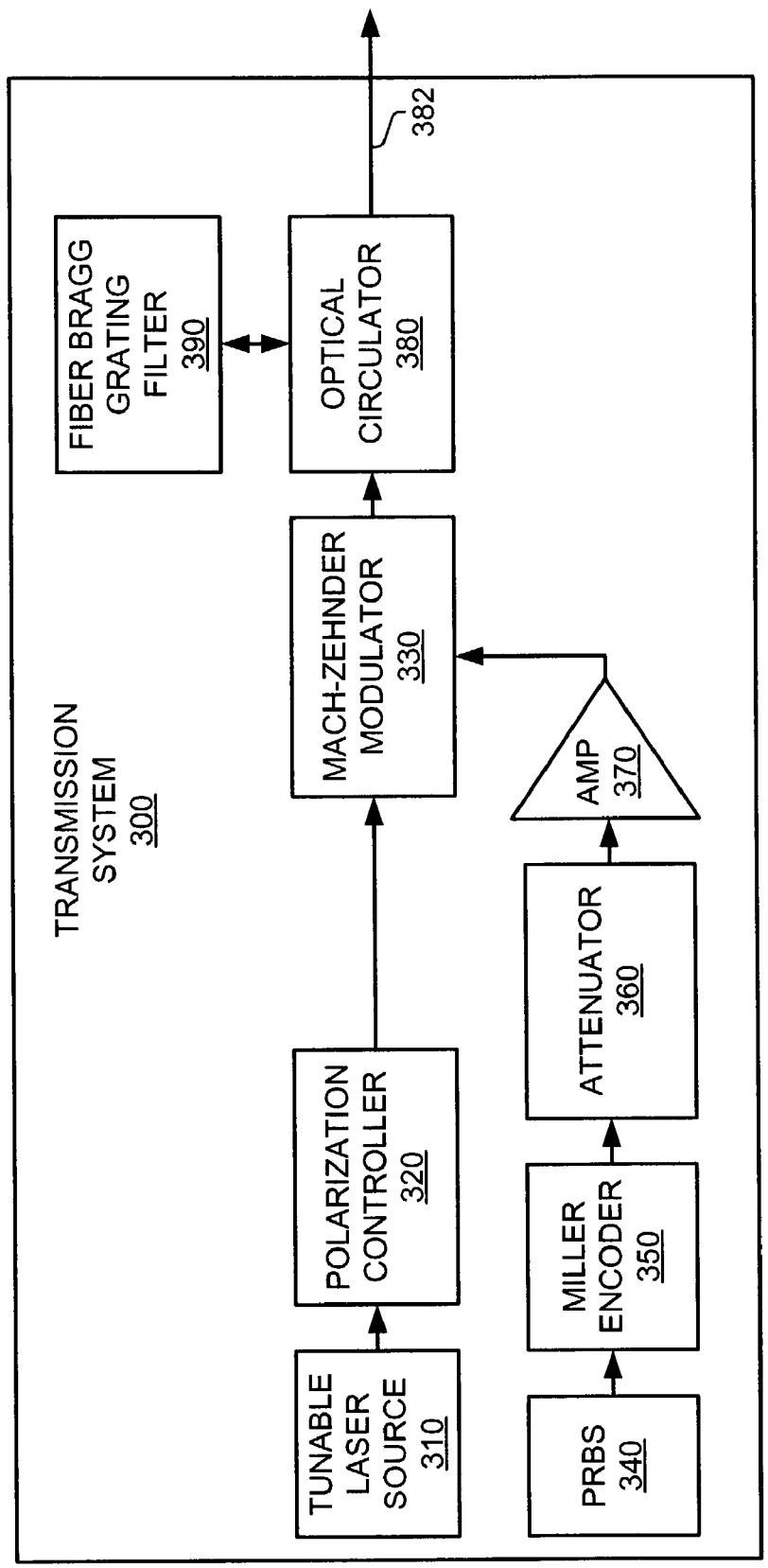
FIG. 3 is an illustration of a transmission system in an example of the invention.

FIG. 3 depicts an illustration of a transmission system 300 in an example of the invention. The transmission system 300 includes a tunable laser source 310, a polarization controller 320, a Mach-Zehnder modulator 330, a pseudo random bit sequence (PRBS) generator 340, a Miller encoder 350, an attenuator 360, an amplifier 370, an optical circulator 380, an optic fiber 382, and a Fiber Bragg Grating filter 390. The tunable laser source 310 is connected to the polarization controller 320. The polarization controller 320 is connected to the Mach-Zehnder modulator 330. The PRBS generator 340 is connected to the Miller encoder 350. The Miller encoder 350 is connected to the attenuator 360. The attenuator 360 is connected to the electrical amplifier 370. The electrical amplifier 370 is connected to the Mach-Zehnder modulator 330. The Mach-Zehnder modulator 330 is connected to the optical circulator 380. The optical circulator 380 is connected to the Fiber Bragg Grating filter 390 and the optic fiber 382.

The tunable laser source 310 is a conventional laser source that can be tuned to a specific frequency (or wavelength). The polarization controller 320 is a conventional device configured to control the polarization of optical signals. The Mach-Zehnder modulator 330 is a conventional device configured to modulate optical signals based on electrical signals. The PRBS generator 340 is a conventional device configured to generate a pseudo random bit sequence. In this embodiment, the PRBS generator 340 runs at 10 Gbps. The Miller encoder 350 is a conventional device that encodes an input signal with Miller coding. In this embodiment, the Miller encoder 350 is built high speed electronics from NTT Electronics Corporation (NEL). The attenuator 360 is a conventional attenuator. In this embodiment, the attenuator 350 comprises a variable part set at about 4-5 dBs and a fixed 6 dB attenuator. The electrical amplifier 370 is a conventional electrical amplifier with a bandwidth of 10 GHz. In this embodiment, the output voltage of the electrical amplifier 370 is about 5V, and the electrical amplifier 370 is manufactured by JDS Uniphase Corporation. The optical circulator 380 is a conventional optical circulator. The Fiber Bragg Grating (FBG) filter 390 is from Templex and has a serial number of 203. The FBG filter 390 is connected to the tail end of the optical circulator 380.

Figure 4:
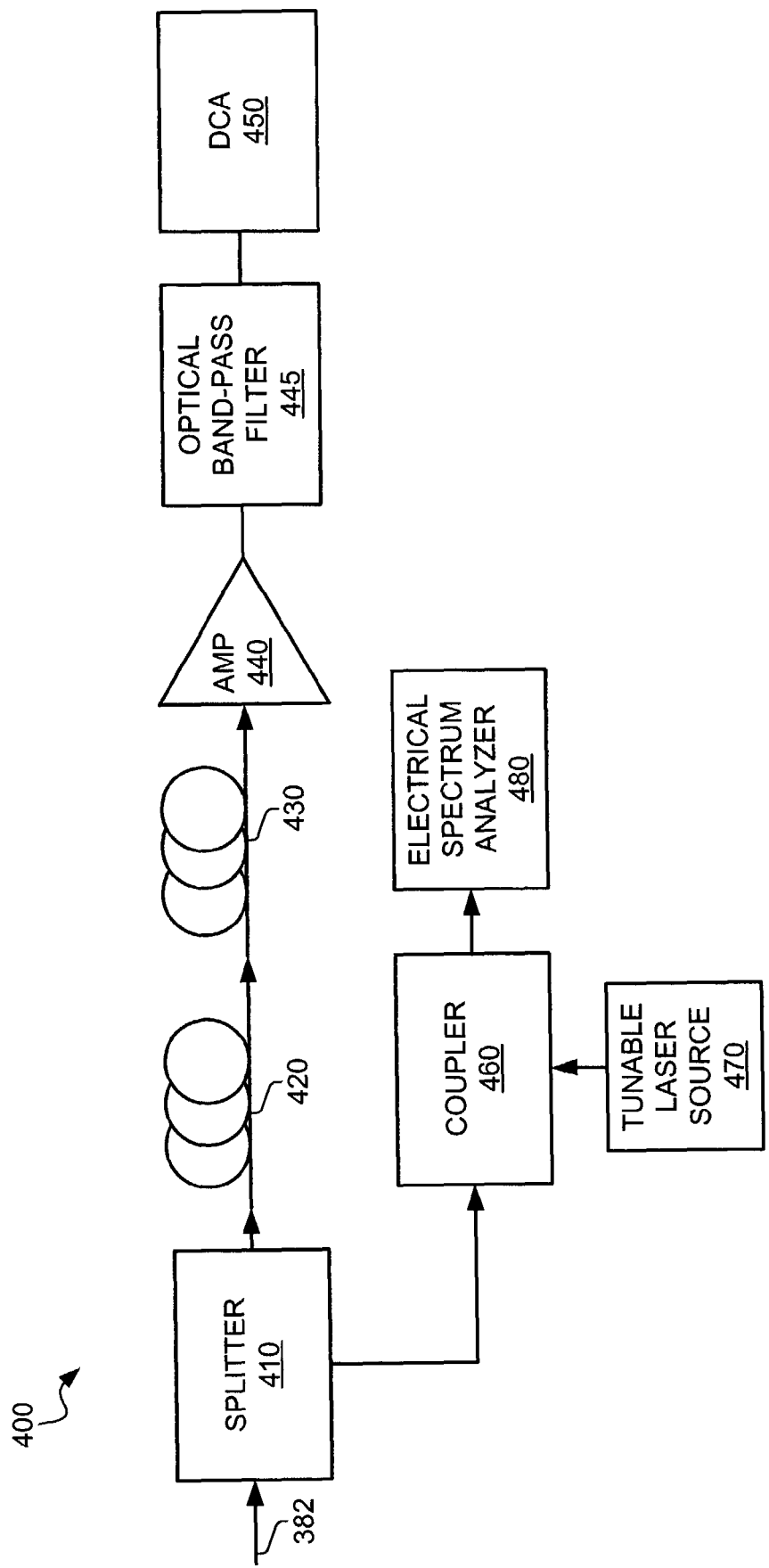
FIG. 4 is an illustration of a communication system in an example of the invention.

FIG. 4 depicts an illustration of a communication system 400 in an example of the invention. The communication system 400 includes the optic fiber 382, a splitter 410, a dispersion compensating fiber (DCF) 420, a single mode fiber (SMF) 430, an amplifier 440, an optical band-pass filter 445, a digital communication analyzer (DCA) 450, a coupler 460, a tunable laser source 470, and an electrical spectrum analyzer 480. The optic fiber 382 is connected to the splitter 410. The splitter 410 is connected to the DCF 420 and the coupler 460. The coupler 460 is connected to the tunable laser source 470 and the electrical spectrum analyzer 480. The DCF 420 is connected to the SMF 430. The SMF 430 is connected to the amplifier 440. The amplifier 440 is connected to the optical band-pass filter 445. The optical band-pass filter 445 is connected to the DCA 450.

The splitter 410 is a conventional optical splitter configured to split an optical signal into two optical signals. The DCF 420 is a conventional optic fiber that compensates for optic fiber's chromatic dispersion. The amplifier 440 is a conventional Erbium doped fiber amplifier (EDFA). The optical band-pass filter 445 is a conventional device that passes only certain signal wavelengths. The DCA 450 detects and monitors user data from the optical signal. In one example, the DCA 450 so uses Miller decoders as described below in FIGS. 5 and 6. The coupler 460 is a conventional coupler configured to combine two optical signals into one optical signal. The tunable laser source 470 is a conventional laser source that can be tuned to a specific frequency. The electrical spectrum analyzer 480 is a conventional device to analyze the signal's power spectrum.

In operation, the tunable laser source 310 is tuned to a specific frequency or wavelength. In one embodiment, the carrier wavelength is around 1554.21 nm. In another embodiment, the carrier wavelength is around 1555.02 nm. In another embodiment, the carrier wavelength is 1555.06 nm with an output power of the tunable laser source 310 of 8 dBm. The tunable laser source 310 transmits a continuous wave optical signal with the specific frequency or wavelength. The polarization controller 320 adjusts the polarization of the continuous wave optical signal.

The PRBS generator 340 generates and transmits an electrical signal with a pseudo random bit sequence. The pseudo random bit sequence is used to simulate user data. The Miller encoder 350 performs Miller coding to the electrical signal with the pseudo random bit sequence. One advantage of Miller coding is the ability to shape the power spectrum which has negligible low-frequency component. Thus, signal power spectrum in the upper sideband and lower sideband are far away from each other to allow filtering of the optical domain to remove one of the sideband. Because optical filtering is not ideal such that only certain frequencies are filtered, one of the sidebands is filtered without affecting the other sideband when the two sidebands are far away enough from each other. Also, in this embodiment, the signal power is concentrated within 0.2 to 0.6 Rb, where Rb is the bit rate of the signal. Thus, the signal is more robust against link impairments such as chromatic dispersion. In other embodiments, the electrical signal with the pseudo random bit sequence is encoded with other phase coding such as Manchester encoding. The attenuator 360 then attenuates the electrical signal based on the settings of the attenuator 360. The electrical amplifier 370 amplifies the electrical signal. The Mach-Zehnder modulator 330 modulates the optical signal with the electrical signal from the electrical amplifier 370. Thus, the optical signal is Miller coded and carries the pseudo random bit sequence.

Figure 7:
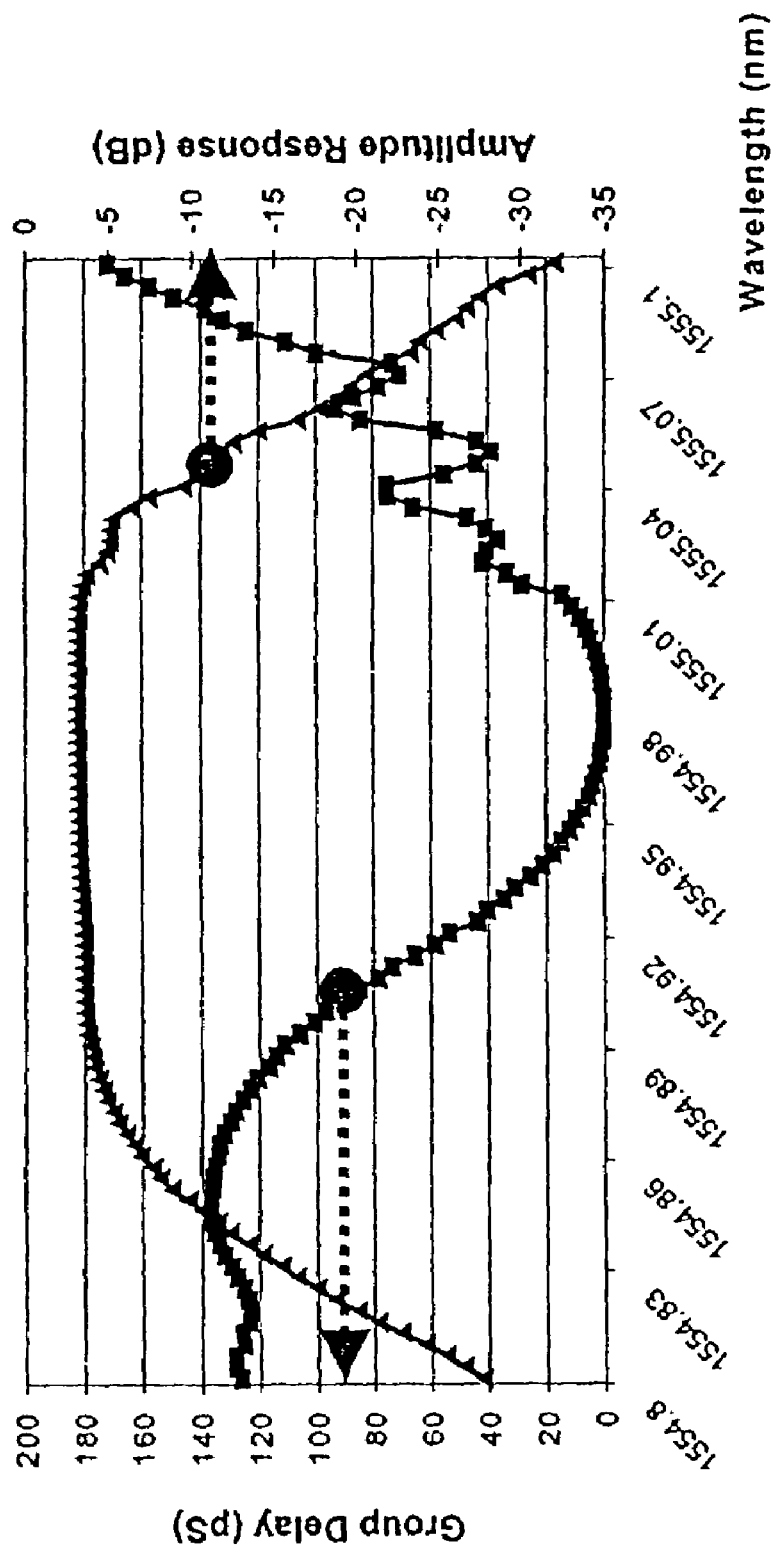
FIG. 7 is a graph of amplitude and group delay response of a FBG filter in an example of the invention.

The optical circulator 380 transfers the optical signal to the FBG filter 390. The FBG filter 390 filters to optical signal in the optical domain to remove one of the sidebands to form a single sideband optical signal. One advantage in this embodiment is there is no RF circuitry involved for sideband suppression. Another advantage is the FBG filter 390 compensates for chromatic dispersion. This is because the group delay response of the FBG filter 390 near the transition edge has a slope that can match to the total dispersion coefficient of the optic fiber link. FIG. 7 depicts a graph of amplitude and group delay response of the FBG filter 390 in an example of the invention. As shown in FIG. 7, the slope at the longer wavelength is optimized for a sharp transition. For example, the slope is about 500 dB/nm, which is 4 dB/GHz. The average slope of the group delay at the transition is about 1000 ps/nm. Although the group delay is not a straight line, the ripples of the group delay slope are negligible.

The optical circulator 380 then transfers the single sideband optical signal to the splitter 410 via the optic fiber 382. The splitter 410 then splits the single sideband optical signal into two single sideband optical signals. The coupler 460 couples one of the single sideband optical signals with a continuous wave optical signal from the tunable laser source 470. The electrical spectrum analyzer 480 then analyzes the resulting signal's spectrum.

The other single sideband optical signal propagates through the DCF 420 and the SMF 430. In this embodiment, the spool of DCF 420 has a total dispersion of −1000 ps/nm to emulate the situation when Reverse (Inverse) Dispersion Fiber is used as a transmission link. In other embodiments, the dispersion of the DCF 420 that compensates the group delay slope of the FBG filter 390 is about −1300 ps/nm. In other embodiment, the dispersion is the range of −1100 ps/nm to 1400 ps/nm. In another embodiment, there are 2 spools of DCF 420 with a total dispersion of −1370 ps/nm with a total loss of about 7.5 dB. The optical amplifier 440 amplifies the single sideband optical signal. The optical band-pass filter 445 filters certain wavelengths from the single sideband optical signal. The DCA 450 then processes the single sideband optical signal for decoding and extraction of the pseudo random bit sequence. In one embodiment, the DCA 450 includes Miller decoders as described below.

Figure 5:
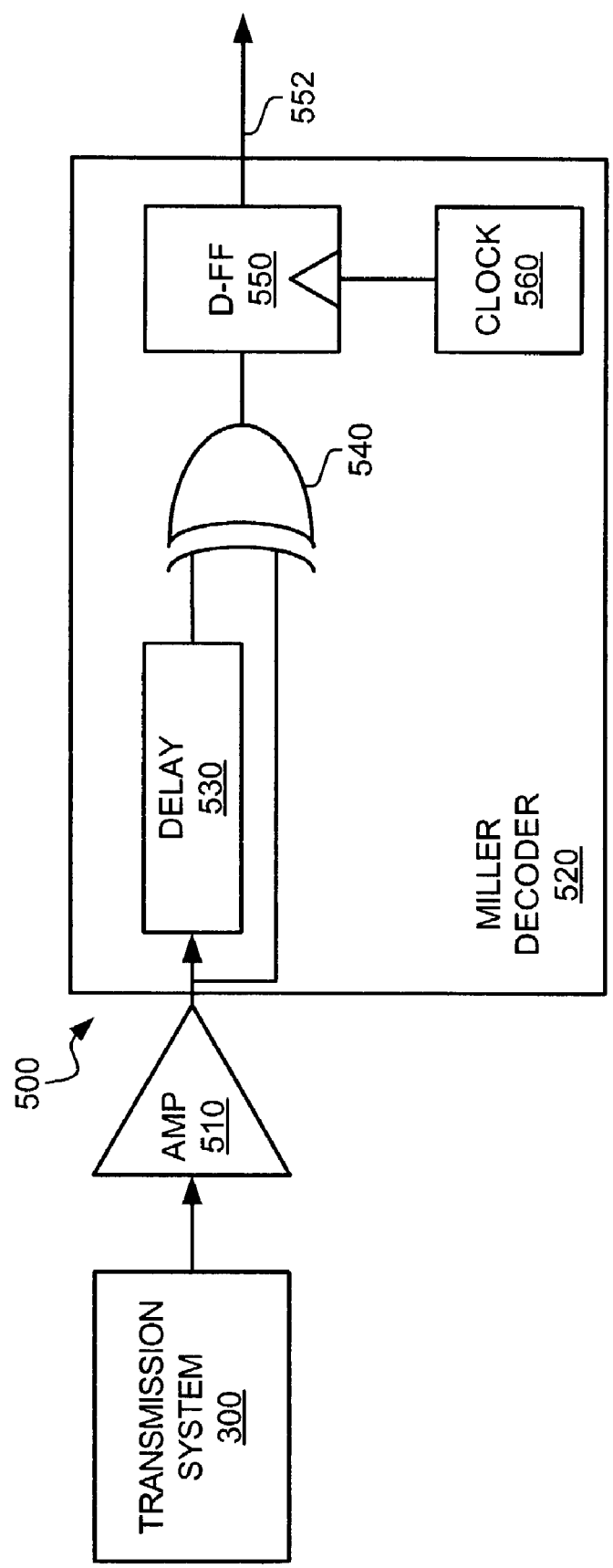
FIG. 5 is an illustration of a communication system with a Miller decoder in an example of the invention.

FIG. 5 depicts an illustration of a communication system 500 with a Miller decoder in an example of the invention. The communication system 500 comprises a transmission system 300, an amplifier 510, and a Miller decoder 520. The Miller decoder 520 comprises a delay 530, an XOR gate 540, a D-flip flop 550, and a clock 560. The transmission system 300 is connected to the amplifier 510. The amplifier 510 is connected to the delay 530 and the input of the XOR gate 540. The delay 530 is connected to the input of the XOR gate 540. The output of the XOR gate 540 is connected to the input of the D-flip flop 550. The clock 560 is connected to the clock input of the D-flip flop 550. The output of the D-flip flop 550 is connected to the link 552, which is connected to a system that performs bit error rate testing.

Figure 6:
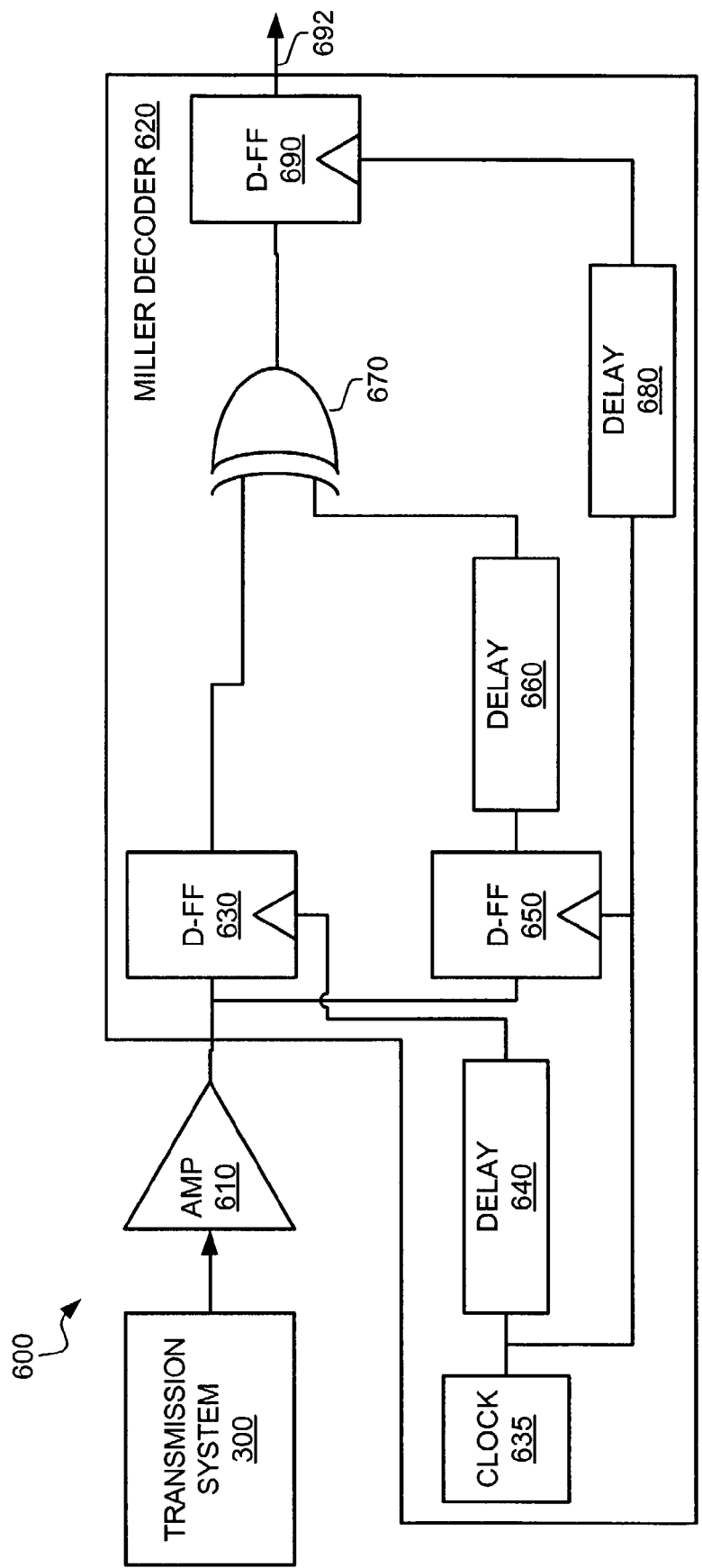
FIG. 6 is an illustration of a communication system with a Miller decoder in an example of the invention.

FIG. 6 depicts another embodiment of the Miller decoder. FIG. 6 depicts an illustration of a communication system 600 with a Miller decoder in an example of the invention. The communication system 600 comprises a transmission system 300, an amplifier 610, and a Miller decoder 620. The Miller decoder 620 comprises a D-flip flop 630, a clock 635, a delay 640, D-flip flop 650, a delay 660, an XOR gate 670, a delay 680, and a D-flip flop 690. The transmission system 300 is connected to an amplifier 610. The amplifier 610 is connected to the input of the D-flip flop 630 and the input of the D-flip flop 650. The clock 635 is connected to the delay 640, the delay 680, and the clock input of the D-flip flop 650. The delay 680 is connected to the clock input of the D-flip flop 690. The delay 640 is connected to the clock input of the D-flip flop 630. The output of the D-flip flop 630 is connected to the input of the XOR gate 670. The output of the D-flip flop 650 is connected to the delay 660. The delay 660 is connected to the input of the XOR gate 670. The output of the XOR gate is connected to the input of the D-flip flop 690. The output of the D-flip flop is connected to the link 692, which is connected to a system that performs bit error rate testing.

Figure 8:
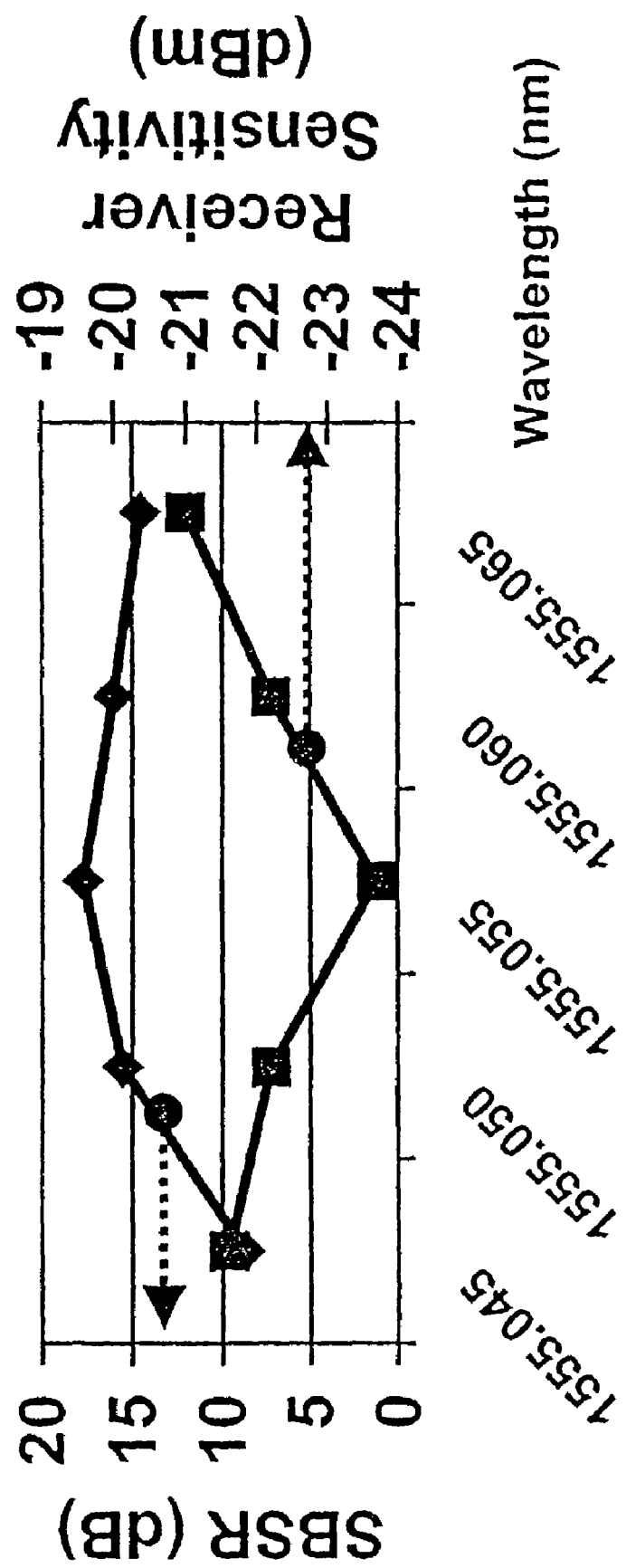
FIG. 8 is a graph of sideband suppression ratio and receiver sensitivity versus the wavelength of the optical carrier in an example of the invention.

FIG. 8 depicts a graph of sideband suppression ratio and receiver sensitivity versus the wavelength of the optical carrier in an example of the invention. In this embodiment, the data rate is 6 Gb/s, and the PRBS $2^{15}-1$ is the test sequence. The maximum sideband suppression ration (SBSR) is dictated by the transition slope of the FBG filter 390 and separation of the two sidebands. For a 6 Gb/s Miller encoded signal, the peak sideband separation is about 4.4 GHz. SBSR is limited to 20 dB or less. For shorter wavelengths such as 1555.045 nm, sideband is not suppressed enough such that SBSR is low. For longer wavelength such as 1555.065 nm, SBSR is also lower due to one of the sideband being completely suppressed while the other is overly suppressed. Receiver sensitivity is a weak function of wavelength. The reason for its lack of flatness is mainly because of the non-ideal phase response of the FBG filter 390. FIG. 8 shows that the wavelength setting of 1555.055 nm results in the highest SBSR, with the lowest (best) receiver sensitivity.

The invention claimed is:

1. A communication method comprising:
   receiving user data and a first optical signal;
   phase encoding the user data to form an encoded signal representing the user data;
   modulating the first optical signal with the encoded signal to form a second optical signal representing the user data, wherein the second optical signal comprises an optical double sideband signal;
   transferring the second optical signal through an optical circulator to an ultra-violet light carved grating;
   filtering the second optical signal in the optical domain via the ultra-violet light carved grating to form an optical single sideband signal representing the user data; and
   transmitting the optical single sideband signal representing the user data via the optical circulator.

2. The communication method of claim 1 wherein phase encoding the user data comprises Miller encoding the user data.

3. The communication method of claim 1 wherein phase encoding the user data comprises Manchester encoding the user data.

4. The communication method of claim 1 further comprising generating the first optical signal.

5. The communication method of claim 1 wherein filtering the second optical signal in the optical domain comprises using a Fiber Bragg grating filter for the second optical signal.

6. The communication method of claim 1 wherein transmitting the optical single sideband signal is over an optic fiber.

7. The communication method of claim 1 further comprising phase decoding the user data from the optical single sideband signal.

8. The communication method of claim 1 wherein modulating the first optical signal with the encoded signal comprises modulating the first optical signal with a Mach-Zehnder modulator based on the encoded signal.

9. The communication method of claim 1 wherein modulating the first optical signal with the encoded signal comprises modulating the first optical signal with an Electro-absorption modulator based on the encoded signal.

10. A communication system comprising:
    a phase encoder configured to receive user data and phase encode the user data to form an encoded signal representing the user data;
    a modulator configured to receive a first optical signal and modulate the first optical signal with the encoded signal to form a second optical signal representing the user data, wherein the second optical signal comprises an optical double sideband signal;
    a filter comprising an ultra-violet light carved grating configured to filter the second optical signal in the optical domain to form an optical single sideband signal representing the user data; and
    an optical circulator configured to transfer the second optical signal to the ultra-violet light carved grating and transmit the optical single sideband signal representing the user data.

11. The communication system of claim 10 wherein the phase encoder is configured to encode the user data with Miller encoding.

12. The communication system of claim 10 wherein the phase encoder is configured to phase encode the user data with Manchester.

13. The communication system of claim 10 further comprising an optical source configured to generate the first optical signal.

14. The communication system of claim 10 wherein the filter comprises a Fiber Bragg grating filter.

15. The communication system of claim 10 wherein the optical circulator is configured to transmit the optical single sideband signal over an optic fiber.

16. The communication system of claim 10 further comprising a phase decoder configured to phase decode the user data from the optical single sideband signal.

17. The communication system of claim 10 wherein the modulator comprises a Mach-Zehnder modulator.

18. The communication system of claim 10 wherein the modulator comprises an Electro-absorption modulator.

* * * * *